(12) United States Patent  
Hayashi et al.

(10) Patent No.: US 7,474,091 B2  
(45) Date of Patent: Jan. 6, 2009

(54) POSITION DETECTOR WITH TILT SENSOR

(75) Inventors: Yasukazu Hayashi, Aichi (JP); Taishi Shimada, Aichi (JP)

(73) Assignee: Okuma Corporation

( * ) Notice: Subject to any disclaimer, the term of this patent is extended or adjusted under 35 U.S.C. 154(b) by 0 days.

(21) Appl. No.: 12/051,963

(22) Filed: Mar. 20, 2008

(65) Prior Publication Data

US 2008/0231265 A1 Sep. 25, 2008

(30) Foreign Application Priority Data

Mar. 20, 2007 (JP) ............... 2007-073248

(51) Int. Cl.
 *G01B 7/30* (2006.01)
 *G01B 7/14* (2006.01)
(52) U.S. Cl. ............... 324/207.25; 324/207.14
(58) Field of Classification Search ......... 324/173–174, 324/207.13–207.14, 207.24–207.25; 73/514.16, 73/514.31, 514.39
 See application file for complete search history.

(56) References Cited

U.S. PATENT DOCUMENTS 5,637,995 A * 6/1997 Izawa et al. ............... 324/174

7,135,856 B2 * 11/2006 Eidenvall et al. ......... 324/207.17

FOREIGN PATENT DOCUMENTS

| JP | 60056216 A | * | 4/1985 |
| JP | 63-205514 | | 8/1988 |
| JP | 1-239412 | | 9/1989 |
| JP | 5-87512 | | 4/1993 |

OTHER PUBLICATIONS esp@cenet patent abstract for Japanese Publication No. 1239412, Publication date Sep. 25, 1989 (1 page).
esp@cenet patent abstract for Japanese Publication No. 63205514, Publication date Aug. 25, 1988 (1 page).
esp@cenet patent abstract for Japanese Publication No. 5087512, Publication date Apr. 6, 1993 (1 page).

* cited by examiner

*Primary Examiner*—Bot LeDynh  
(74) *Attorney, Agent, or Firm*—Osha•Liang LLP

(57) ABSTRACT

A scale section is made of a magnetic material. A repeated pattern is recorded at a uniform pitch on the surface of the scale section. A sensor section is provided independently from the scale section. The sensor section is provided with a magnetic position sensor that reads the pattern, on a surface close to the surface of the scale section. Further, the sensor section is provided with a magnetic tilt sensor that detects a tilt between the surface of the scale section and the surface of the sensor section on which the position sensor is located. The magnetic position detector in which the scale section and the sensor section are separated from each other can be efficiently fixed to a detection target using the tilt sensor.

7 Claims, 3 Drawing Sheets

POSITION DETECTOR WITH TILT SENSOR

CROSS-REFERENCE TO RELATED APPLICATION

The entire disclosure of Japanese Patent Application No. 2007-73248 filed on Mar. 20, 2007 including specification, claims, drawings and abstract is incorporated herein by reference.

BACKGROUND OF THE INVENTION

1. Field of the Invention

The present invention relates to a magnetic position detector including a scale section made of a magnetic material and a sensor section provided independently from this scale.

2. Description of the Related Art

Conventionally, a position detector in which a scale section and a sensor section are separated has been used for position detection of, for example, a main shaft of a machine tool. In such a position detector, the scale section is made of a magnetic material, and the sensor section has a magnetic position sensor on its surface close to a circumference surface of the scale section. Because such a position detector uses magnetic field for position detection, it has excellent environmental resistance to water, oil, and the like. In addition, scale sections of different sizes can be manufactured without difficulty by machining. There is a further advantage that it is possible to use a common sensor section for the differently sized scale sections.

FIG. 4 shows a top view of the above-described conventional position detector. A scale section 2 is composed of, for example, a cylindrical soft magnetic material and fixed to a rotation shaft 1 on the detection target side. The scale section 2 also has concavities and convexities of a gear pitch λ on the circumference surface. A sensor section 4 is fixed on an installation surface 9 on the non-rotational side of a detection target using mounting bolts 7 and 8, and a magnetic position sensor 5 is located on a surface 6 close to the circumference surface on the scale section 2 side. When the rotation shaft 1 rotates, the magnetic position sensor 5 detects a magnetic change caused by the concavities and convexities on the circumference surface of the scale section 2. The sensor section 4 detects a rotational position of the rotation shaft 1 based on the magnetic change detected by the position sensor 5 using an incorporated signal processing circuit. The sensor section 4 further transmits the detected rotational position information to an external device via a cable 11 using serial communication.

With the position detector as shown in FIG. 4, there is a problem that detection accuracy of the position detector deteriorates when a contacting circumference surface 3 of the scale section 2 and a surface 6 on which the position sensor 5 is positioned are not positioned in parallel to each other with sufficient accuracy, that is, when the interval between them is not uniform. For this reason, in the conventional example of FIG. 4, a guide surface 10 is provided on the installation surface 9 on the non-rotational side of the detection target. This guide surface 10 serves to fix the scale section 2 to the installation surface 9 such that the contacting circumference surface 3 and the surface 6 of the sensor section 4 are parallel to each other with a uniform interval in between. Additionally, as a method of fixing a sensor section, as in Japanese Laid-Open Publication No. Hei 1-239412, a method has been widely known in which a fixing jig is temporarily inserted between a scale section and a sensor section to fix the sensor. Position detectors are described in, for example, Japanese Laid-Open Publication No. Hei 1-239412, Japanese Laid-Open Publication No. Sho 63-205514, and Japanese Laid-Open Publication No. Hei 5-87512.

With the conventional position detector shown in FIG. 4, it is necessary to accurately machine guide surfaces for fixation use on both measurement target side and sensor section side. Providing such an accurate guide surface entails difficult machining and assembly, resulting in cost increase. Further, in a method using a fixing jig, when differently sized scale sections are manufactured, a dedicated fixing jig is necessary for each size. A wide variety of fixing jigs are consequently necessary to be provided for replacement in case of failure, etc. Even when a fixing jig is used, an accurate guide surface is still necessary in a position in contact with a fixing jig on the sensor section side.

SUMMARY OF THE INVENTION

In the present invention, a sensor section is provided with a tilt sensor that detects a tilt between a surface of a scale section and a surface of the sensor section on which a position sensor is located. As such, it is possible to recognize tilt information detected by this tilt sensor when the sensor section is fixed to a detection target. For example, during fixation of the sensor section, it is possible to perform adjustment for installation while monitoring an NC screen, a dedicated display device, an LED display mounted on the sensor section, or the like. With such a configuration, there is no need to provide a guide surface for fixation use or a dedicated fixing jig to achieve a uniform tilt during fixing of the sensor section, thereby reducing cost. It is also possible to fix the sensor section to a detection target more accurately than in the method using a guide surface, thereby improving detection accuracy of a position detector. Moreover, it is further possible to detect a failure in a setting state of the sensor section and the scale section by appropriately checking information of the tilt sensor.

In this way, according to the present invention, regarding a magnetic position detector in which a scale section and a sensor section are separated, it is possible to fix the sensor section to a detection target accurately with in a low-cost and accurate manner.

DESCRIPTION OF THE PREFERRED EMBODIMENT

Figure 1:
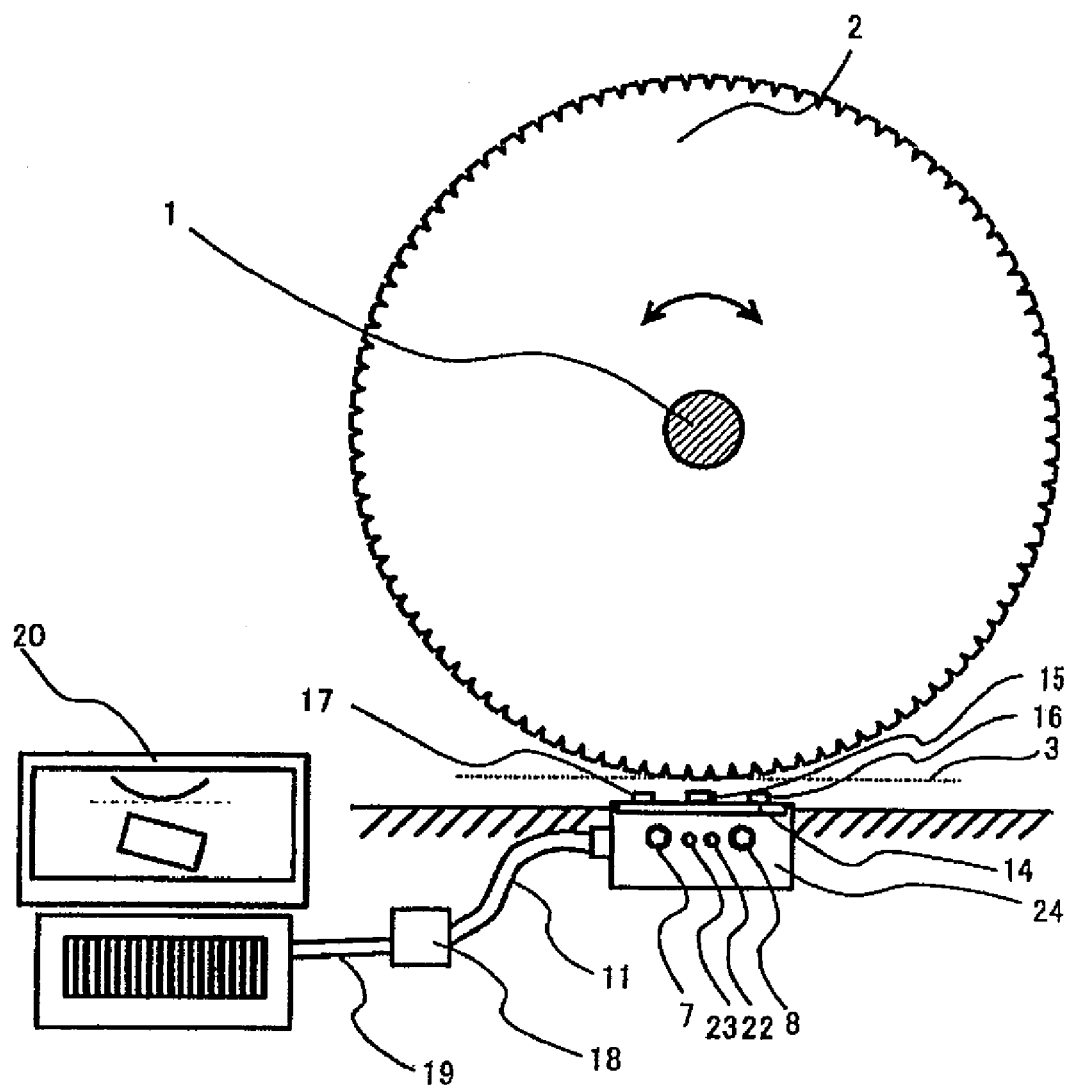
FIG. 1 is a top view illustrating a position detector with a tilt sensor according to an embodiment of the present invention.
Figure 2:
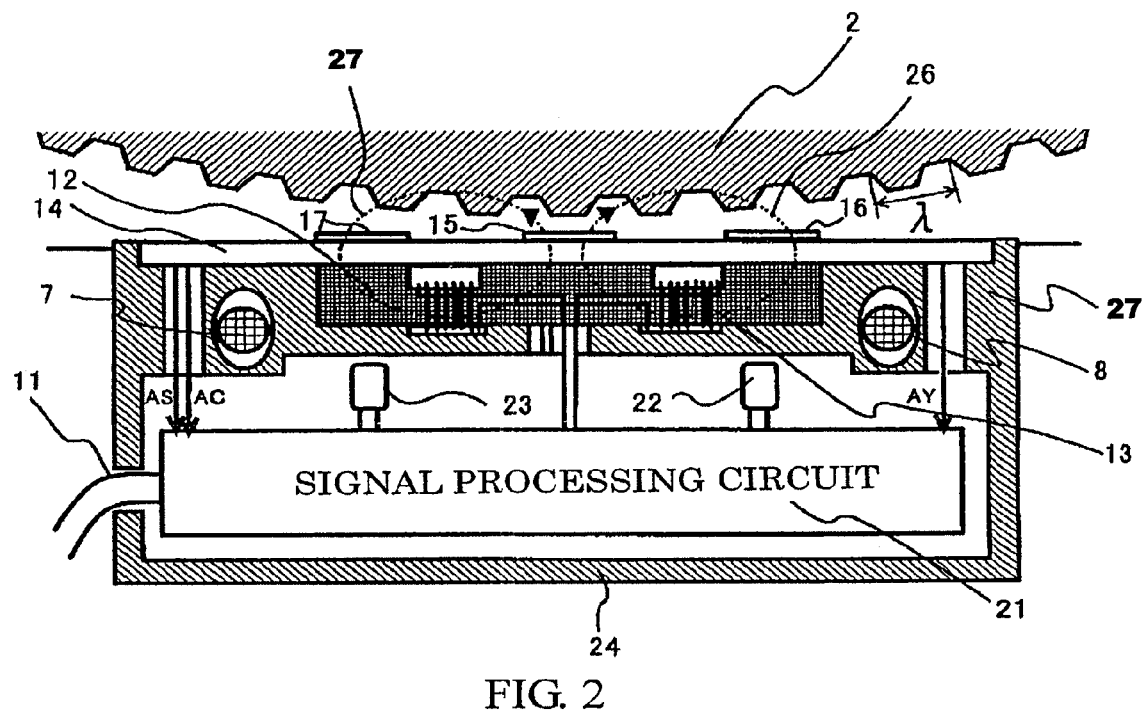
FIG. 2 is an upper perspective illustrating an inside structure of the sensor section 12 of FIG. 1.
Figure 3:
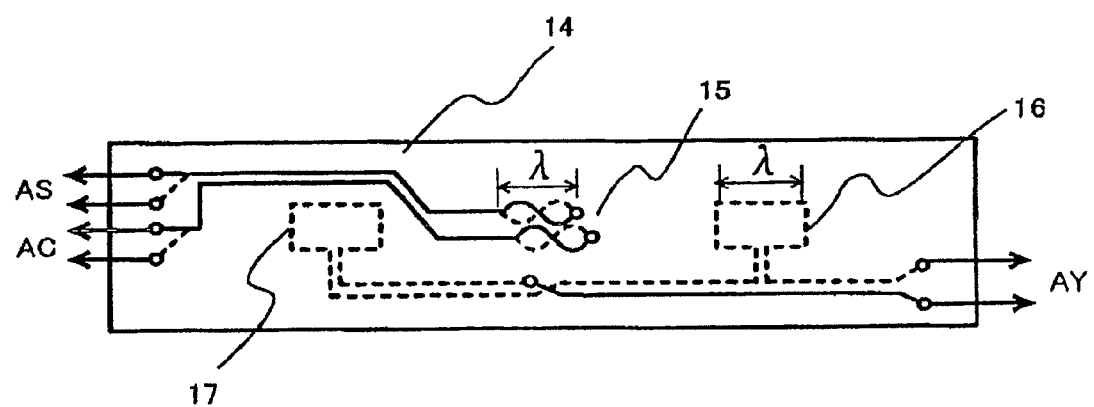
FIG. 3 shows a configuration of a printed circuit board 24 of FIG. 2.
Figure 4:
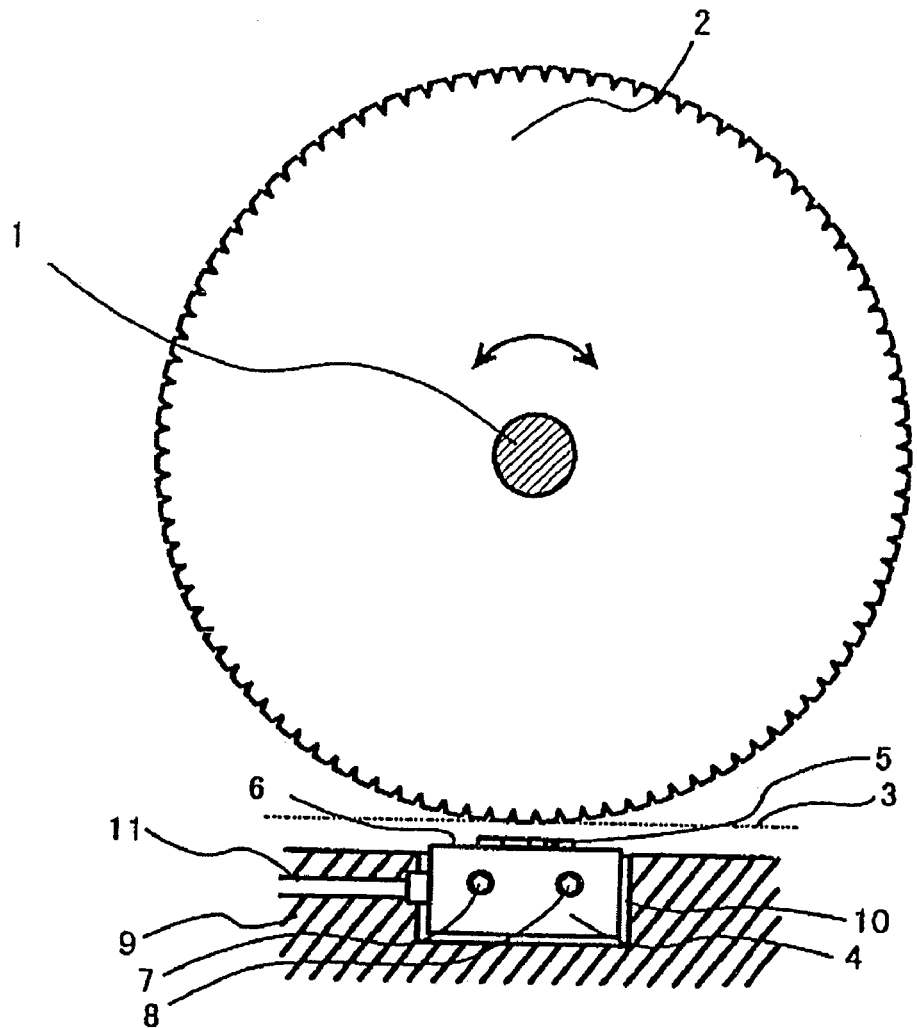
FIG. 4 is a top view illustrating a conventional position detector.

Hereinafter, an embodiment of the present invention will be described based on the drawings. FIG. 1 is a top view illustrating a position detector with a tilt sensor according to an embodiment. FIG. 2 is a top perspective view illustrating an inside structure 24 of the sensor section of FIG. 1. FIG. 3 shows a configuration of a printed circuit board 14 of FIG. 1.

In FIG. 1, a housing 25 of the sensor section 24 is made of an aluminum material, and a printed circuit board 14 is adhesively fixed on the sensor section 24 on its surface close to a circumference surface of a scale section 2. The printed circuit board 14 is in contact with an E-shaped core 12 which is made of ferrite and buried in the housing 25. In FIG. 2, the E-shaped core 12 has a configuration including two grooves on the top surface. Coils 13 are wound around the groove portions of the E-shaped core to apply AC magnetic flux on the E-shaped core 12 by an exciting current EI from a signal processing circuit 21. In such a manner, three surface portions of the E-shaped core 12 that are in contact with the printed circuit board 14 generate AC magnetic flux circling from the center portion to the two end portions as shown by dot-and-dash lines 25 and 26 passing through the scale section 2 side. Regarding the widths of the three surface portions on the E-shaped core 12 side that are in contact with the printed circuit board 14, the width of the center portion is $2\lambda$ and the width of the two end portions is $\lambda$. By setting the widths to integer multiples of $\lambda$ in this manner, the average amount of magnetic flux passing through each surface portion is rarely changed by the influence of the concavities and convexities on the circumference surface of the scale section 2.

In a region close to the E-shaped core 12 in the center portion of the printed circuit board 14, two coils each composed of a two layer conductive pattern in a sinusoidal waveform having a wavelength of pitch $\lambda$ are placed such that the coils are in a phase relationship in which the coils are different by $\lambda/4$ (that is, they are shifted from each other by $\lambda/4$ in a movement direction of the scale section), thereby constituting a position detection sensor 15. In the position detection sensor 15, when the scale section 2 is rotated, the AC magnetic flux generated from the center portion of the E-shaped core 12 changes due to reluctance changes caused by the concavities and convexities on the scale section 12. Then, the two coils constituting the position sensor 15 output induced AC voltages AS and AC that change at amplitudes proportional to a sine value and a cosine value of the rotation amount, respectively. The signal processing circuit 21 digitizes the amplitudes of the induced AC voltages AS and AC into two amplitude values, and performs an arctangent calculation on these two amplitude values to convert them into value PO indicating a rotational position of the rotation shaft 1. The signal processing device 21 further calculates square root sum of squares of the amplitude values of the induced AC voltage AS and AC and converts the result into a value GAP indicating a distance between the scale section 2 and the printed circuit board 14.

Distance sensor elements 16 and 17 composed of square-shaped conductive patterns are located on the printed circuit board 14 in two regions close to the E-shaped core 12 that are equally apart from the center portion of the printed circuit board 14 along the positive movement direction (the right side in FIG. 3) and the reverse direction (the left side in FIG. 3) of the scale section 2. Both distance sensor elements 16 and 17 are coils having the widths of approximately $\lambda$, and are located so as to surround the regions close to the E-shaped core 12. When the distance from the circumference surface of the scale section 2 changes, the AC magnetic flux generated from both ends of the E-shaped core 12 changes, and the distance sensor elements 16 and 17 composed of the coils generate induced AC voltages according to the changes in their respective distances to the circumference surface. Further, when the distances between the distance sensor elements 16 and 17 and the circumference surface of the scale section 2 are equal to each other, the AC voltages are connected to each other in series on the printed circuit board 14 so as to cancel each other out, and the result is outputted as an AC voltage AY. With this configuration, the amplitude change of the AC voltage AY is almost proportional to a tilt between the contacting circumference surface 3 of the scale section 2 and the surface of the printed circuit board 14. The signal processing circuit 21 digitizes an amplitude of the AC voltage AY and converts the result to a value YAW indicating the tilt between the contacting circumference surface 3 of the scale section and the surface of the printed circuit board 14. In such a manner, in this embodiment, the distance sensors 16 and 17 constitute the tilt sensor.

The signal processing circuit 21 controls lightning of LEDs 22 and 23 based on the value YAW indicating a value GAP indicating a distance and a value YAW indicating a tilt. Specifically, when the value GAP indicating the distance is greater compared to an optimal value, the LED 22 and the LED 23 are turned off. When the value GAP indicating the distance is smaller compared to the optimal value, the LED 22 and the LED 23 are turned on and off. Further, when the value YAW indicating the tilt is not the optimal value, one LED on the side of the shorter distance is turned on and off and the other LED on the side of the longer distance is turned off even where the value GAP indicating the distance is the optimal value. When both value GAP indicating the distance and value YAW indicating the tilt are optimal values, the LED 22 and the LED 23 are turned on. In such a manner, the sensor section 24 is fixed to a detection target with reference to indications of the LEDs. It is thus possible to fix the sensor section 24 such that the surface of the sensor section 24 on which the position sensor 15 is located and the contacting circumference surface 3 of the scale section 2 are parallel to each other with a uniform interval in between.

The signal processing circuit 21 also transmits to an external device rotational position information detected via the cable 11 using a serial communication. The signal processing circuit 21 further can output a value GAP and a value YAW in response to a request from outside using serial communication. FIG. 1 shows an example wherein adjustment is performed during fixation of the sensor section 24, and the cable 11 is temporarily connected to a signal converter 18. The signal converter 18 converts a serial signal from the sensor section 24 to a signal for a USB interface and connects the sensor section 24 and a personal computer 20 via the USB interface. The personal computer 20 displays a state of fixation of the sensor section 24 as a graphic based on a value GAP and a value YAW of the sensor section 24, which are obtained by the USB interface. In such a manner, the sensor section 24 is fixed to a detection target with reference to the screen of the personal computer. It is thus possible to accurately fix the sensor section 24 such that the surface of the sensor section 24 on which the position sensor 15 is located and the contacting circumference surface 3 of the scale section 2 are parallel to each other with a uniform interval in between.

Other than when being adjusted for installation, the sensor section 24 is normally connected to, for example, a motor controller that controls a motor which drives the rotation shaft 1.

Additionally, it is also possible to detect a failure of a setting state of the sensor section and the scale section by appropriately checking information of the distance sensors 16 and 17. For example, information of the distance sensors 16 and 17 may be checked constantly, upon start-up, or at a certain time interval.

Although in the present embodiment a tilt is detected by obtaining a distance to a position on a circumference surface in which a pattern is recorded, based on signals of the distance sensor elements 16 and 17, it is naturally possible to perform tilt detection by detecting a distance to a position on the circumference surface of the scale section 2 in which a pattern is not recorded using the distance sensor elements 16 and 17. However, such a configuration there is a problem that the thickness of the scale section 2 in the axial direction is increased.

Further, although in the present embodiment an example was described in which a coil magnetized by an AC magnetic flux from the sensor section side is used as a distance sensor element, as described in JP 1-239412 A, it is also possible to realize a distance sensor element using magnetic sensor elements such as a magnetoresistive element or a Hall element which are exited by a DC magnetic field of, for example, a permanent magnet from the sensor section side.

Still further, although the present embodiment described the scale section which has the concavities and convexities at uniform pitches on the circumference surface, the present invention can also be realized using a position detector as described in JP 63-205514 A, in which N poles and S poles are alternately magnetized at uniform pitches on the circumference surface of the scale section. In such a case, the exciting unit from the sensor section is unnecessary, and a magnetic sensor element such as a magnetoresistive element or a Hall element can be used as a distance sensor element.

Moreover, although in the present embodiment an example was described in which a position sensor and a tilt sensor are separately provided, it is well-known that a distance to the scale section can be detected from a signal of a magnetic position sensor, as disclosed in JP 5-87512 A, and that a plurality of position sensors may be used together as a distance sensor element.

In addition, although in the present embodiment, an example was described in which a distance between the scale section and the position sensor is detected using the position sensor, it is also possible to detect a distance between the scale section and the position sensor using the distance sensor element of the tilt sensor.

Moreover, although in the present embodiment a rotational position detector was described, the present embodiment can be realized using a linear position detector.

What is claimed is:

1. A position detector comprising:
   a scale section that is made of a magnetic material and is recorded with a pattern repeated at a uniform pitch on a surface; and
   a sensor section that is provided independently from the scale section,
   wherein the sensor section comprises:
      a magnetic position sensor that is provided on a surface of the sensor section close to the surface of the scale section to read the pattern; and
      a magnetic tilt sensor that detects a tilt between the surface of the scale section and the surface of the sensor section on which the position sensor is located.

2. The position detector according to claim 1, wherein:
   the tilt sensor comprises a plurality of magnetic distance sensor elements that detect a distance to the surface of the scale section; and
   the plurality of distance sensor elements are arranged on the surface on which the position sensor is located in positions apart from one another along a relative movement direction with respect to the scale section to detect the tilt based on distance information of the plurality of distance sensor elements.

3. The position detector according to claim 2, wherein:
   the sensor section has an exciting unit that generates an AC magnetic flux to the surface of the scale section; and
   the plurality of distance sensor elements comprise coils.

4. The position detector according to claim 3, wherein the coils of the plurality of distance sensor elements are connected to one another in series.

5. The position detector according to claim 3, wherein the position sensor and the tilt sensor are composed of a conductive pattern on the same printed circuit board.

6. The position detector according to claim 1, wherein the scale section is a circular disc and records a repeated pattern on its circumference surface.

7. The position detector according to claim 1, wherein tilt information detected by the tilt sensor is outputted to an external device using serial communication.

\* \* \* \* \*

UNITED STATES PATENT AND TRADEMARK OFFICE
CERTIFICATE OF CORRECTION

| | |
|---|---|
| PATENT NO. | : 7,474,091 B2 |
| APPLICATION NO. | : 12/051963 |
| DATED | : January 6, 2009 |
| INVENTOR(S) | : Yasukazu Hayashi |

Page 1 of 1

It is certified that error appears in the above-identified patent and that said Letters Patent is hereby corrected as shown below:

On the front cover of the patent under section 56, References Cited, U.S. Patent Documents, please add --5,339,030  8/1994  Hayashi--.

Signed and Sealed this

Twenty-ninth Day of September, 2009

David J. Kappos
*Director of the United States Patent and Trademark Office*